June 22, 1937.  F. M. VOGAN  2,084,467
MANUFACTURE OF WASHTUBS
Filed Nov. 23, 1934  3 Sheets-Sheet 1
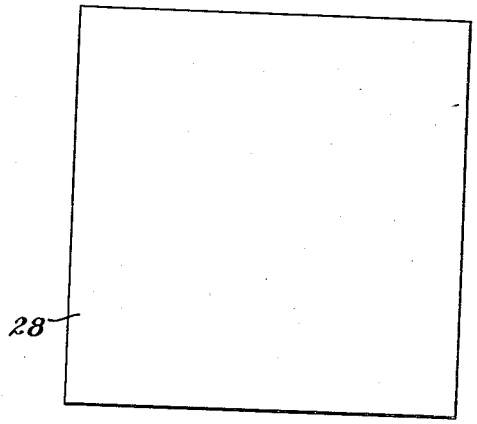
Fig. 1
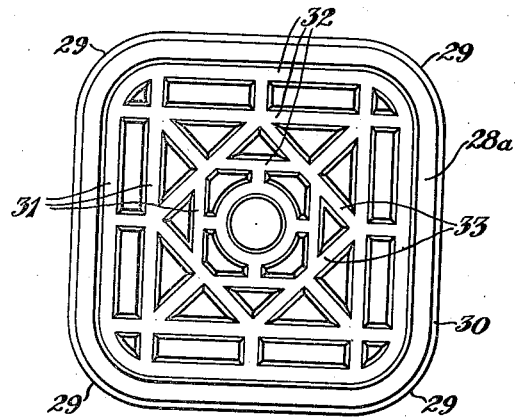
Fig. 2
Fig. 3
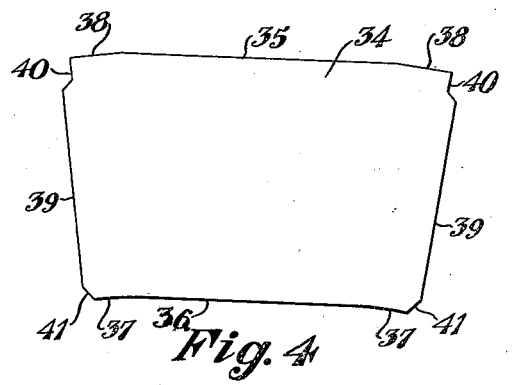
Fig. 4
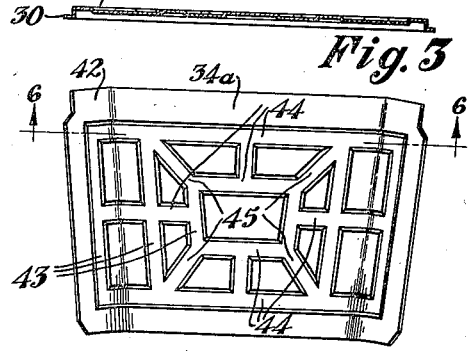
Fig. 5
Fig. 6
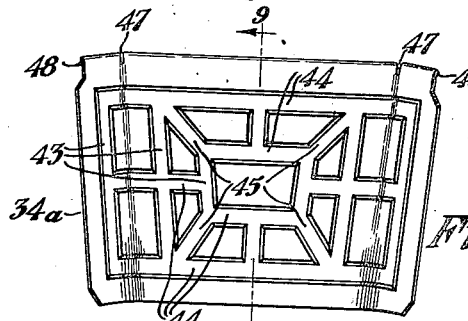
Fig. 8
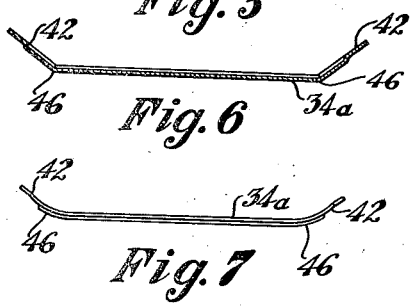
Fig. 7
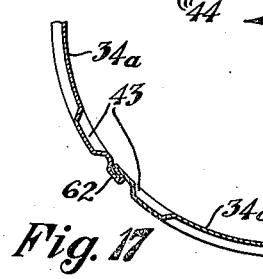
Fig. 17
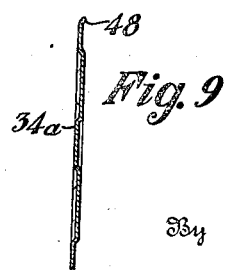
Fig. 9
Inventor
F. M. Vogan
By Frease and Bishop
Attorneys June 22, 1937.  F. M. VOGAN  2,084,467
MANUFACTURE OF WASHTUBS
Filed Nov. 23, 1934  3 Sheets-Sheet 2
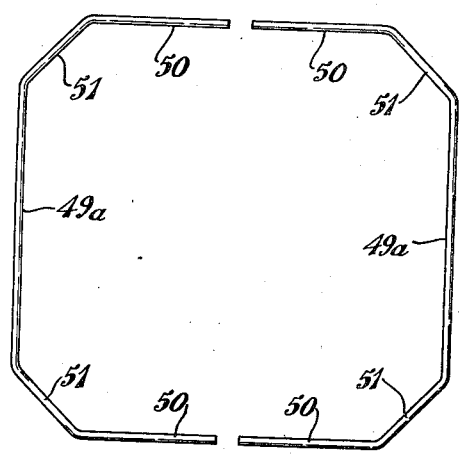
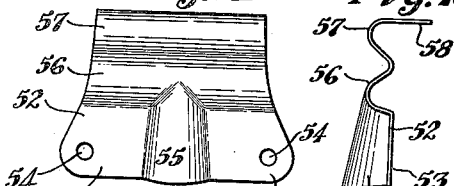
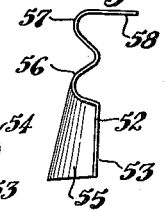
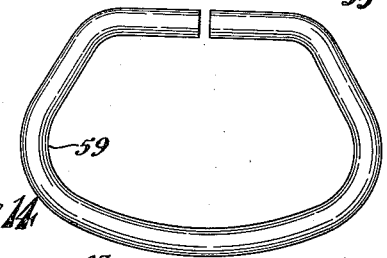
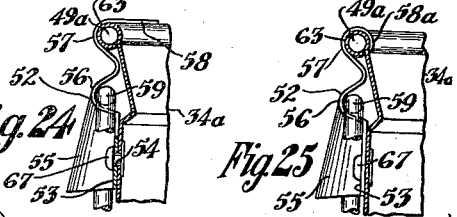
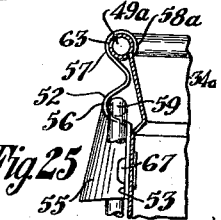
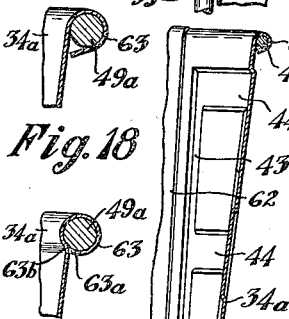
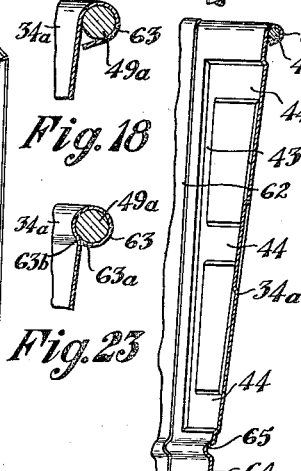
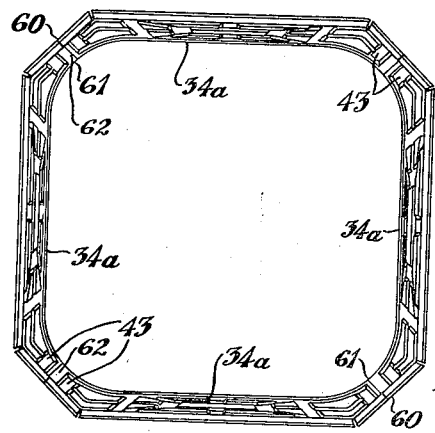
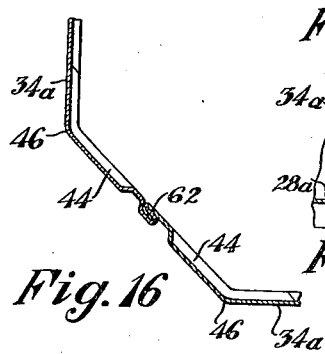
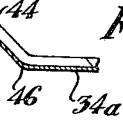
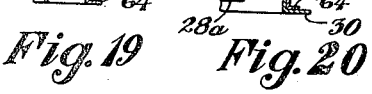
Inventor
F. M. Vogan June 22, 1937.  F. M. VOGAN  2,084,467
MANUFACTURE OF WASHTUBS
Filed Nov. 23, 1934   3 Sheets-Sheet 3
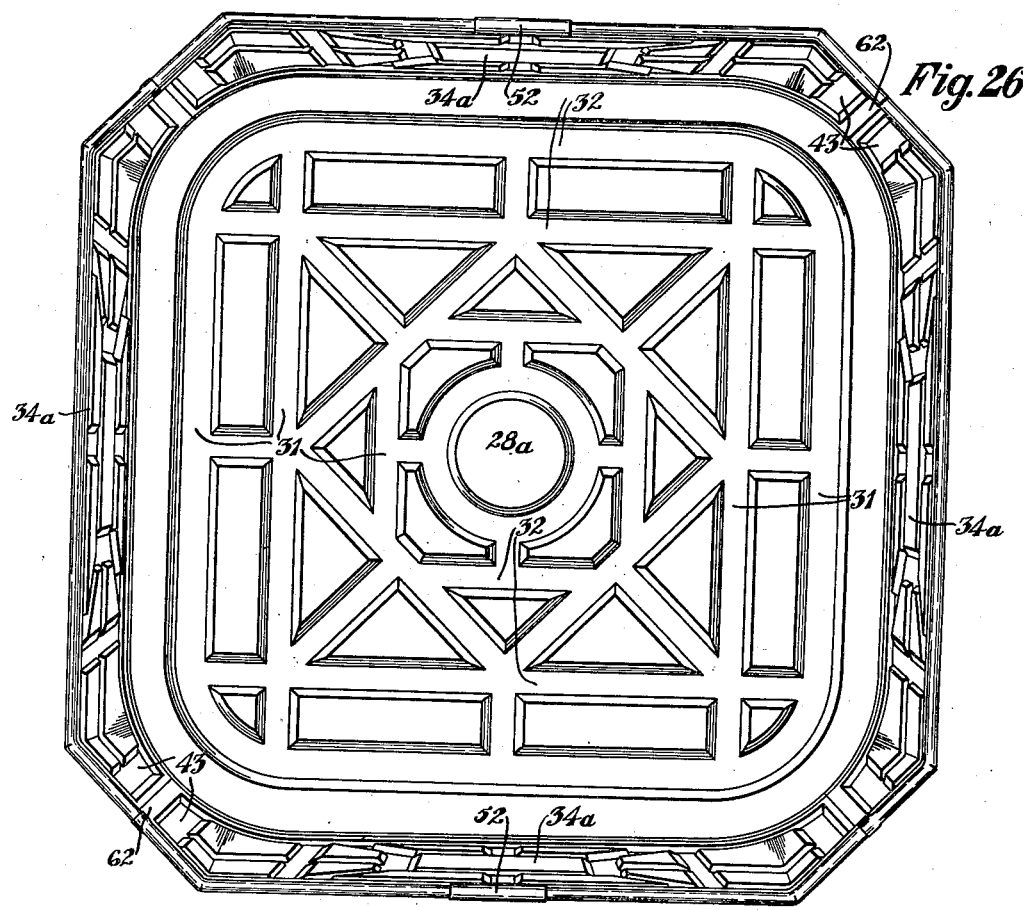
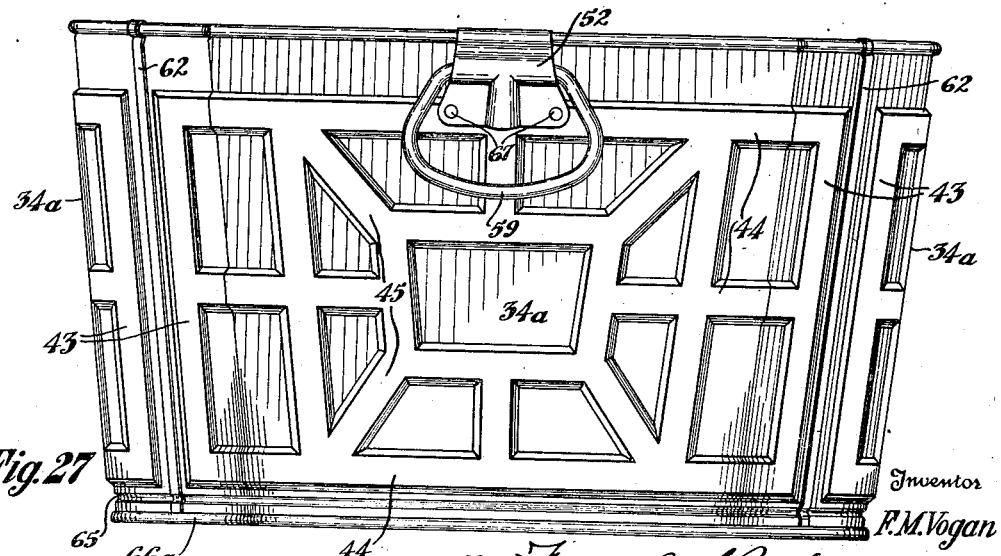

Patented June 22, 1937

2,084,467

UNITED STATES PATENT OFFICE 2,084,467

MANUFACTURE OF WASHTUBS

Frank M. Vogan, Canton, Ohio, assignor to The Reeves Manufacturing Company, Dover, Ohio, a corporation of Ohio Application November 23, 1934, Serial No. 754,455

7 Claims. (Cl. 113—120)

The invention relates to the manufacture of containers such as wash tubs, and more particularly to the manufacture of washtubs and the like, made up of assembled side wall and bottom members, and more especially to the manufacture of composite sheet metal washtubs and the like and to certain novel steps in the manufacture thereof by which the manufacture is simplified and a superior product is produced.

This application is in part a continuation of my copending application Serial No. 657,179, filed February 17, 1933.

Sheet metal washtubs are commonly formed of rounded or circular shape comprising a circular or disk-like sheet metal bottom and rounded side walls connected thereto and usually formed of two sheet metal parts joined or seamed together at their abutting ends and connected to the bottom portion by a water-tight seam or joint. It is then customary to strengthen or reinforce the side walls of the otherwise completed tub by swedging the same at a point intermediate the top and bottom thereof.

It is known that rectangular sheet metal tubs are at present being manufactured under Kielberg Patent No. 1,935,848 but in the manufacture of tubs under the Kielberg patent, in the same manner as the ordinary practice of making round tubs, the side walls are formed from plain blanks which are swedged after the tub is assembled.

Not only does this swedging require an extra operation which adds to the cost of production of the tub but because the swedging is formed after the parts of the tub are assembled and is carried through the side seams of the tub, there is danger of opening the side seams by the swedging operation.

These substantially rectangular tubs possess many advantages over the conventional round tubs which make the same very handy and convenient in many respects. For instance, when two round tubs are placed together for the purpose of passing clothes or articles being washed from one tub to the other, as by a clothes wringer, the rim portions of the two tubs will touch each other only at one point, permitting water to be spilled between the tubs onto the floor or washbench as well as possibly permitting some of the articles being washed to accidentally drop between the tubs. The rounded side walls of the tubs also make it inconvenient to attach a clothes wringer thereto.

The same inconvenience is experienced in placing one of the conventional round tubs alongside of the customary square stationary tub as water may be spilled between the edges of the tubs and there is always danger of articles being accidentally dropped through the space between the two tubs.

An object of the present invention is to not only overcome the disadvantages and inconveniences present in the conventional round tub but to improve upon the construction and manufacture of substantially rectangular tubs such as disclosed in the Kielberg patent above referred to.

The above and other objects may be attained by forming a substantially rectangular sheet metal tub preferably having outwardly and upwardly flared side walls, the rim portions of which may fit snugly against the rim portion of a similar tub or of a stationary tub of customary rectangular shape, the corners of the tub being beveled or flattened at the upper portion of the tub and preferably rounded at the lower portion to correspond to the rounded corners formed upon the bottom member of the tub.

The invention further contemplates the provision of a tub formed of a sheet metal bottom portion and preformed sheet metal side walls which are stamped to form stiffening ribs or corrugations, obviating the necessity of swedging the side walls. In carrying out the invention, four identically similar side walls may be formed, each of which may include a flat side portion having angular extensions at both ends adapted to be seamed or joined to the corresponding angular extensions of the adjacent side wall portions to produce beveled or flat corners for the tub.

Ribs or corrugations, preferably of greater height than the seams, are formed in these angular extensions at each side of each seam or joint, so as to protect the same, and upright ribs or corrugations, as well as angular ribs or corrugations, are preferably formed in the flat portion of each side wall adjacent to each corner bend, thus providing ribs on each side of each corner bend of the side walls and on each side of each seam, as well as across the face of each side wall, strengthening and protecting all of these portions of the tub.

The above objects, together with others which will be apparent from the drawings and following description, or which may be hereinafter pointed out, may be attained by constructing the tubs in the manner illustrated in the accompanying drawings, in which Figure 1 is a plan view of a sheet metal blank from which the bottom member is stamped;

Fig. 2, a plan view of the bottom member which is stamped from the blank shown in Fig. 1 and preformed with the corrugations or ribs therein in a single operation;

Fig. 3, a transverse sectional view through the bottom member shown in Fig. 2;

Fig. 4 is a plan view of a sheet metal blank from which one of the side members is formed;

Fig. 5 is a plan view of a partially finished side member showing the first operation upon the blank shown in Fig. 4, the ribs or corrugations being formed therein and the side end portions being bent angularly at the upper end and rounded at the lower end;

Fig. 6 is a section through the partially finished side wall member shown in Fig. 5, taken as on the line 6—6, Fig. 5;

Fig. 7 is a lower end view of the partially finished side wall shown in Fig. 5;

Fig. 8 shows the completed side wall member, the upper corners being slit and the top edge being partially rounded in a single operation;

Fig. 9 is a vertical sectional view through the side wall member shown in Fig. 8, taken as on the line 9—9, Fig. 8;

Fig. 10 is an elevation of a section of wire for forming one of the top wires after the same has been straightened and cut off to length;

Fig. 11 is a plan view of the two top wires which are formed from two wire blanks as shown in Fig. 10, after they have been formed in the forming die;

Fig. 12 is an elevation of one of the handle clips as blanked and formed in one operation from a strip of sheet iron;

Fig. 13, an edge elevation of the same;

Fig. 14, an elevation of one of the wire handles as straightened, cut and formed in one operation;

Fig. 15, a top plan view of the body portion of the tub after the four side wall members, as shown in Fig. 8, have been seamed together at their side edges;

Fig. 16, an enlarged section through the upper portion of one corner of the body portion shown in Fig. 15;

Fig. 17, a similar section through the lower portion of one corner of the body portion;

Fig. 18, a fragmentary enlarged sectional view through the upper portion of the tub showing the top wire with the upper portion of the side wall rolled over the same;

Fig. 19, a fragmentary vertical sectional view through one side wall of the body of the tub showing the horizontal bead cut in at the lower portion of the body to seat the bottom member, and showing the top wire in place, as illustrated in Fig. 18;

Fig. 20 is a view similar to Fig. 19, showing the bottom member in position to be seamed;

Fig. 21 is a fragmentary sectional view of the lower portion of the body member showing the bottom member double seamed thereto;

Fig. 22, a view similar to Fig. 21, showing the double seam flattened;

Fig. 23 is a view similar to Fig. 18, showing the top edge portion of the tub back wired;

Fig. 24 is a fragmentary section of the upper portion of the tub at the joint of the top wires showing the handle clip riveted in place;

Fig. 25, a similar view showing the top flange of the handle clip curled over the top wires to reinforce the joint;

Fig. 26, an enlarged top plan view of the finished tub; and

Fig. 27, a side elevation of the same.

Similar numerals refer to similar parts throughout the drawings.

The following is a detail description of the manufacture of tubs such as shown in Figs. 26 and 27. These tubs are rectangular and preferably of substantially square cross section but having corners which are beveled or angular at the upper portion of the tub and rounded toward the bottom of the tub to accommodate the bottom member, the side walls of the tub being preferably flared upwardly and outwardly. These tubs are formed generally of four identically similar side wall members seamed together at their side edges to form a body member and closed at the lower end by a separate bottom member.

Each side wall member, as well as the bottom member, is preformed or embossed with a plurality of upright, horizontal and angularly disposed ribs or corrugations for strengthening the finished tub. Substantially U-shaped reinforcing wires are located in the bead at the top of the tub and the joints of these wires may be reinforced and strengthened by handle clips located at the joints of the wires and curled over the top bead of the tub.

To form the bottom member of the tub, a substantially square sheet metal blank, as shown at 28 in Fig. 1, is sheared and in a single operation is stamped and embossed to form the bottom member 28a, shown in Figs. 2 and 3, having the rounded corners 29 and the offset flange 30 around its entire edge portion. As shown in Figs. 2 and 3, in the same operation in which the bottom member is stamped and formed, substantially the entire area thereof is embossed with a plurality of intersecting right angled ribs or corrugations 31 and 32 and angular corrugations or ribs 33, all formed in a single operation of a press or other suitable apparatus provided with the proper dies for stamping, forming and embossing the bottom member.

To form each of the side wall members of the tub, a flat blank 34 is sheared from a sheet of metal, this blank being of generally tapered construction having the top and bottom edges 35 and 36 respectively, each of which is substantially straight throughout its middle or flat main portion, the straight lower edge merging at its ends into downwardly curved portions 37 adjacent the ends of the blank, while the upper edge terminates in downwardly angled portions 38 adjacent the ends of the blank.

The end edges 39 are downwardly inclined toward each other and are offset or cut away at the upper corners of the blank as at 40, while the lower corners of the blank are beveled as at 41, thus providing means at each end of each blank for forming seams by means of which a plurality of the side wall members may be seamed together to form the substantially rectangular body portion of the tub, as will be later described in detail.

These blanks 34 may be blanked out of metal sheets on an appropriately shaped blanking die and the blank thus made is then formed and embossed in a single operation into the side wall member 34a as shown in Figs. 5, 6 and 7. In this operation, the end portions 42 of the blank are both bent toward the same face of the blank, being angled at the upper portion of the blank as best shown in Fig. 6 and curved at the lower end thereof as shown in Fig. 7. With the same operation of bending the end portions, substantially the entire area of the blank is embossed, forming the upright ribs 43, the horizontal ribs 44 and the angular ribs 45 which strengthen and reinforce substantially the entire area of the side wall member.

It will be seen that one of the upright ribs or corrugations 43 is located on each side of each corner bend 46, while a plurality of the horizontal ribs 44 are extended through each corner bend and around the angular or curved end portion 42, thus strengthening and reinforcing the corners of each side wall member.

In the next operation upon the side wall member, the upper corners are slit as shown at 47 in Fig. 8 and the upper edge is slightly curled as shown at 48 in Figs. 8 and 9. The side wall member is now completed, being shaped and formed and having the embossing or ribs preformed therein ready to be assembled to a plurality of similar side wall members to form the flared, peripherally closed body portion of a substantially square tub.

Rim strengthening means is provided for the upper edge of the tub and for this purpose what might be termed top wires are provided, these wires being of sufficient thickness to substantially reinforce the upper edge portion of the tub when the same is curled or beaded around the wires. Preferably two generally U-shaped top wires are provided for reinforcing the upper edge of each tub.

In forming these top wires, wire of suitable thickness is straightened and cut off to the proper length for making one top wire in a single operation, forming a straight length of wire of proper size as indicated at 49 in Fig. 10. In another operation, each length of wire blank 49 is run through a forming die, forming the same into a generally U-shaped wire as indicated at 49a, terminating in the end portions 50 at right angles to the main or central portion and connected thereto by the angled portions 51 located at substantially a 45° angle. Two of these top wires 49 are formed for the top of each tub, being placed end to end in substantially the position shown in Fig. 11.

For the purpose of attaching handles to the tub, sheet iron clips are formed. Two of these clips are used upon each tub and in forming the same, a strip of sheet metal of the proper width is first sheared and each clip, as indicated generally at 52 in Figs. 12 and 13, is blanked and formed in a single operation. Each of these clips is provided at its lower corners with a pair of attaching ears 53 having apertures 54 by means of which they may be riveted or otherwise attached to the body of the tub, these ears being separated by a substantially vertical strengthening corrugation 55 extending from the lower edge of the clip upward to the substantially horizontal corrugation 56 arranged to receive the handle, as will be later described, a second horizontal corrugation 57 being located above the handle receiving corrugation to receive the bead at the upper edge of the tub and terminating in the substantially horizontal flange portion 58 for a purpose which will be later described.

Each of the wire handles indicated generally at 59 in Fig. 14 is formed in a single operation in which the wire is straightened, cut and shaped as shown in said figure.

Four of the side wall members as shown in Figs. 8 and 9 are then joined together at their ends, the end portions of adjacent side wall members being seamed together, producing a substantially rectangular outwardly and upwardly flared body portion as shown in Fig. 15, said body portion having four straight sides and angular corners as shown at 60, which merge into rounded corners 61 at the lower end of the body portion.

The ends of the side wall members are double seamed together as shown at 62 at the corners of the tub and as shown in Fig. 17, it will be seen that one of the upright corrugations 43, of greater height than the seam 62, is located on each side of said seam, protecting the same as well as strengthening and reinforcing the corner construction of the tub. It will also be seen, as shown in Fig. 16, that the horizontal ribs 44 terminate adjacent to opposite sides of the seam 62 and that they extend around the corner bends 46, thus reinforcing and strengthening the entire corner construction of the tub.

The top wires 49a are then attached, the two wires being placed around the outside of the body portion at the upper open end thereof adjacent to the outwardly curled upper edge 48 and by means of suitable dies, the upper open edge portion of the body member is beaded over the wires, as indicated at 63 in Figs. 18 and 19.

In the next operation, the outturned angular flange 64 is formed at the bottom of the body portion and the inwardly disposed rib 65 is simultaneously formed therein at a point spaced slightly above said flange, as shown in Fig. 19. This rib 65 is for the purpose of seating the bottom member and in the next operation the bottom member 28a is inserted into the open lower end of the body portion seating against the rib 65, while the flange 39 of the bottom member seats against the outturned flange 64 of the body portion in the manner shown in Fig. 20. The bottom is then double seamed to the body as shown in Fig. 21, the flanges 30 and 64 being folded into a double seam 66 as shown in said figure and by another operation the seam thus formed is flattened into the shape shown at 66a in Fig. 22.

The top edge of the tub is then back wired as shown in Fig. 23, the bead being curled tightly around the underside of the top wire 49a as indicated at 63a, while the inside of the body is cut in around the top wire as shown at 63b in Fig. 23, tightly enclosing the top wires within the beaded upper edge of the tub.

The handle clips 52 are then attached to the rim portion of the tub, these handle clips being located on opposite sides of the tub and at the points where the joints in the top wires are located. As shown in Fig. 24, each handle clip is placed in position with the bead 63 received in the upper horizontal corrugations 57 of the handle clip and is riveted to the side wall of the tub by means of rivets 67 located through the apertures 54 in the ears 53 of the handle clip and through the adjacent side wall of the tub. The horizontal flange 58 of the clip extends inward over the top of the bead as shown in Fig. 24 and in the next operation this flange is curled or beaded down around the inside of the bead as shown at 58a in Fig. 25. The structurally completed tub as shown in Figs. 26 and 27 is thus produced and it may be finished in any usual and well known manner such as by pickling, washing and galvanizing or the like, after which the tub when properly labeled is ready for shipment.

It will be seen from the above that by preforming the embossing or corrugations in the side wall members and bottom member before the same are assembled to produce a complete tub, the necessity of swedging the body portion of the completed tub is obviated, thus eliminating this operation as well as the possibility of opening the side seams of the body by the swedging operation. At the same time it will be obvious that a tub of much stronger construction is produced by embossing the side walls than is possible by producing the tub of substantially plain flat walls subsequently swedged.

I claim:

1. In the manufacture of sheet metal containers, the steps comprising forming a sheet metal side wall blank with a relatively flat main portion having substantially straight parallel upper and lower edges and with end portions having upwardly diverging end edges, at least one end portion having its upper edge inclined downward at an angle to the upper edge of the main portion and having its lower edge curved downward from the lower edge of the main portion when positioned in the same plane as said main portion, embossing substantially the entire area of said side wall blank with ribs and bending said end portion transversely of the upper and lower edges of the side wall blank into flaring shape, connecting said side wall blank to at least one other identically similar side wall blank to form a flared, peripherally closed body, connecting a bottom closure member to the smaller rim portion of the body to form an upwardly flared container, placing two substantially U-shaped reinforcing wires end to end around the larger rim of the container, curling said larger rim over said wires to form a rim bead, attaching sheet metal handle clips to the side walls at the joints in said wires, and curling said handle clips over said bead to reinforce said joints.

2. In the manufacture of sheet metal containers, the steps comprising forming a sheet metal side wall blank with a relatively flat main portion having substantially straight parallel upper and lower edges and with end portions having upwardly diverging end edges, at least one end portion having its upper and lower edges extending at angles to the upper and lower edges of the main portion when positioned in the same plane as said main portion, embossing substantially the entire area of said side wall blank with ribs and bending said end portion transversely of the upper and lower edges of the side wall blank into flaring shape, connecting said side wall blank to at least one other identically similar side wall blank to form a flared, peripherally closed body, connecting a bottom closure member to the smaller rim portion of the body to form an upwardly flared container, placing two substantially U-shaped reinforcing wires end to end around the larger rim of the container, curling said larger rim over said wires to form a rim bead, attaching sheet metal handle clips to the side walls at the joints in said wires, and curling said handle clips over said bead to reinforce said joints.

3. In the manufacture of sheet metal containers, the steps comprising forming a sheet metal side wall blank with a relatively flat main portion having substantially straight parallel upper and lower edges and with end portions having upwardly diverging end edges, at least one end portion having its upper edge inclined downward at an angle to the upper edge of the main portion and having its lower edge curved downward from the lower edge of the main portion when positioned in the same plane as said main portion, embossing substantially the entire area of said side wall blank with ribs and bending said end portion transversely of the upper and lower edges of the side wall blank into flaring shape, connecting said side wall blank to at least one other identically similar side wall blank to form a flared, periphery closed body, forming an inwardly disposed, horizontal rib in said body at a point near the smaller rim portion thereof, seating a bottom closure member against said rib and double seaming said bottom closure member to said body to form an upwardly flared container.

4. In the manufacture of sheet metal containers, the steps comprising forming a sheet metal side wall blank with a relatively flat main portion having substantially straight parallel upper and lower edges and with end portions having upwardly diverging end edges, at least one end portion having its upper edge inclined downward at an angle to the upper edge of the main portion and having its lower edge curved downward from the lower edge of the main portion when positioned in the same plane as said main portion, embossing substantially the entire area of said side wall blank with upright, horizontal and angular ribs and bending said end portion transversely of the upper and lower edges of the side wall blank into flaring shape, connecting said side wall blank to at least one other identically similar side wall blank to form a flared, peripherally closed body, bending the entire larger portion of the body to form a bead to strengthen the same, and connecting a bottom closure member to the smaller rim portion of the body to form an upwardly flared container.

5. In the manufacture of sheet metal containers, the steps comprising forming a sheet metal side wall blank with a relatively flat main portion having substantially straight parallel upper and lower edges and with end portions having upwardly diverging end edges, at least one end portion having its upper edge inclined downward at an angle to the upper edge of the main portion and having its lower edge curved downward from the lower edge of the main portion when positioned in the same plane as said main portion, embossing substantially the entire area of said side wall blank with ribs and bending said end portion transversely of the upper and lower edges of the side wall blank into flaring shape, connecting said side wall blank to at least one other identically similar side wall blank to form a flared, peripherally closed body, bending the entire larger portion of the body to form a bead to strengthen the same, forming an inwardly disposed, horizontal rib in said body at a point near the smaller rim portion thereof, seating a bottom closure member against said rib and double seaming said bottom closure member to said body to form an upwardly flared container.

6. In the manufacture of sheet metal containers, the steps comprising forming a sheet metal side wall blank with a relatively flat main portion having substantially straight parallel upper and lower edges and with end portions having upwardly diverging end edges, at least one end portion having its upper edge inclined downward at an angle to the upper edge of the main portion and having its lower edge curved downward from the lower edge of the main portion when positioned in the same plane as said main portion, embossing substantially the entire area of said side wall blank with ribs and bending said end portion transversely of the upper and lower edges of the side wall blank into flaring shape, connecting said side wall blank to at least one other identically similar side wall blank to form a flared, peripherally closed body, connecting a bottom closure member to the smaller rim portion of the body to form an upwardly flared container, placing two substantially U-shaped reinforcing wires end to end around the larger rim of the container, and curling said larger rim over said wires to form a rim bead.

7. In the manufacture of sheet metal containers, the steps comprising forming a sheet metal side wall blank with a relatively flat main portion having substantially straight parallel upper and lower edges and with end portions having upwardly diverging end edges, at least one end portion having its upper and lower edges extending at angles to the upper and lower edges of the main portion when positioned in the same plane as said main portion, embossing substantially the entire area of said side wall blank with ribs and bending said end portion transversely of the upper and lower edges of the side wall blank into flaring shape, connecting said side wall blank to at least one other identically similar side wall blank to form a flared, peripherally closed body, connecting a bottom closure member to the smaller rim portion of the body to form an upwardly flared container, placing two substantially U-shaped reinforcing wires end to end around the larger rim of the container, and curling said larger rim over said wires to form a rim bead.

FRANK M. VOGAN.